US007330720B2

(12) United States Patent
Hinz

(10) Patent No.: US 7,330,720 B2
(45) Date of Patent: Feb. 12, 2008

(54) TIME ZONE BASED PHONE SERVICES

(75) Inventor: Lorne C. Hinz, Plano, TX (US)

(73) Assignee: Nortel Networks Limited, Quebec (CA)

( * ) Notice: Subject to any disclaimer, the term of this patent is extended or adjusted under 35 U.S.C. 154(b) by 254 days.

(21) Appl. No.: 10/676,166

(22) Filed: Sep. 30, 2003

(65) Prior Publication Data

US 2005/0070282 A1    Mar. 31, 2005

(51) Int. Cl.
*H04Q 7/20* (2006.01)
(52) U.S. Cl. ............. 455/422; 455/412; 455/414; 455/418; 455/426; 455/575
(58) Field of Classification Search ......... 455/422, 455/412, 414, 418, 426, 575, 560, 561, 566, 455/519, 515
See application file for complete search history.

(56) References Cited

U.S. PATENT DOCUMENTS

| 6,097,945 | A  | * | 8/2000  | Evensen et al. | 455/422.1 |
|-----------|----|---|---------|----------------|-----------|
| 6,128,485 | A  | * | 10/2000 | Mori et al.    | 455/422.1 |
| 6,138,002 | A  | * | 10/2000 | Alperovich et al. | 455/407 |
| 6,330,454 | B1 | * | 12/2001 | Verdonk        | 455/456.2 |
| 6,411,807 | B1 | * | 6/2002  | Amin et al.    | 455/432.3 |
| 6,442,391 | B1 | * | 8/2002  | Johansson et al. | 455/456.2 |
| 6,745,023 | B1 | * | 6/2004  | Offer          | 455/410 |
| 2003/0040313 | A1 | * | 2/2003 | Hogan et al.  | 455/435 |
| 2005/0249023 | A1 | * | 11/2005 | Bodlaender   | 365/232 |

* cited by examiner

*Primary Examiner*—William Trost
*Assistant Examiner*—Julio Perez
(74) *Attorney, Agent, or Firm*—Garlick, Harrison & Marksion; James A. Harrison

(57) ABSTRACT

A method and apparatus provides for, as a part of call setup and routing whenever a calling party calls a called party, which includes determining a local time for the called party prior to completing call setup. If the local time is within a specified time range, a message is played to the calling party to advise the calling party of the local time for the called party. In one embodiment of the invention, the calling party is given the option of leaving a message or of continuing with the call in the case of an emergency. The message delivered to the calling party may be one that is generated by an interactive voice response unit or by a short message service server. In either case, based upon the calling party's response to the message, the inventive method and apparatus result in the cellular network either taking a message for the called party or routing the call to the called party as normal. As an additional aspect of the present invention, the method and apparatus also provide for merely enabling an individual to determine a local time for an entered area code or country code or mobile station. Moreover, if the individual enters a local time, the inventive method and apparatus provide for calculating a corresponding local time for a specified country code or area code or mobile station.

21 Claims, 6 Drawing Sheets

FIG. 1 communication network 10

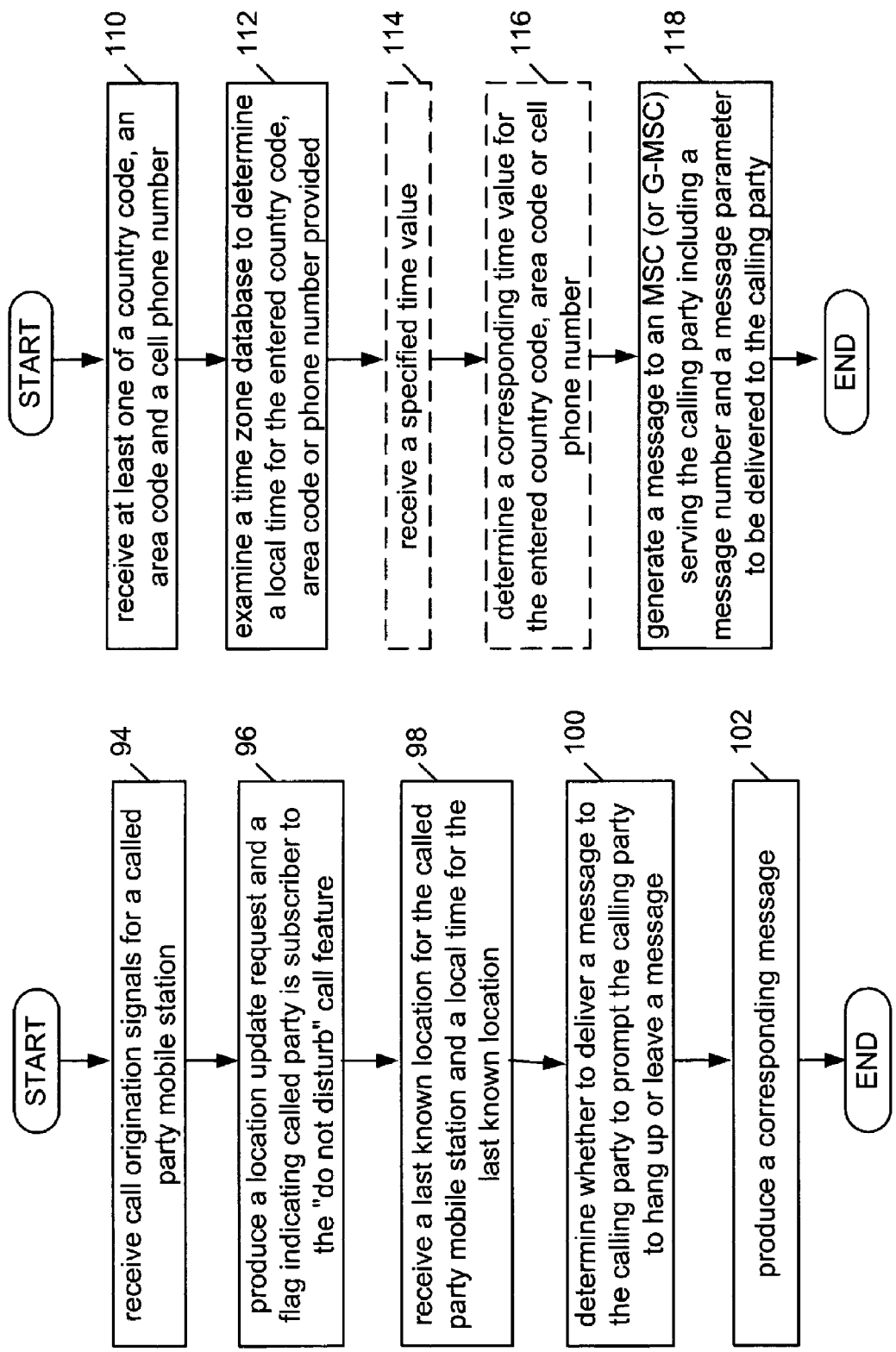

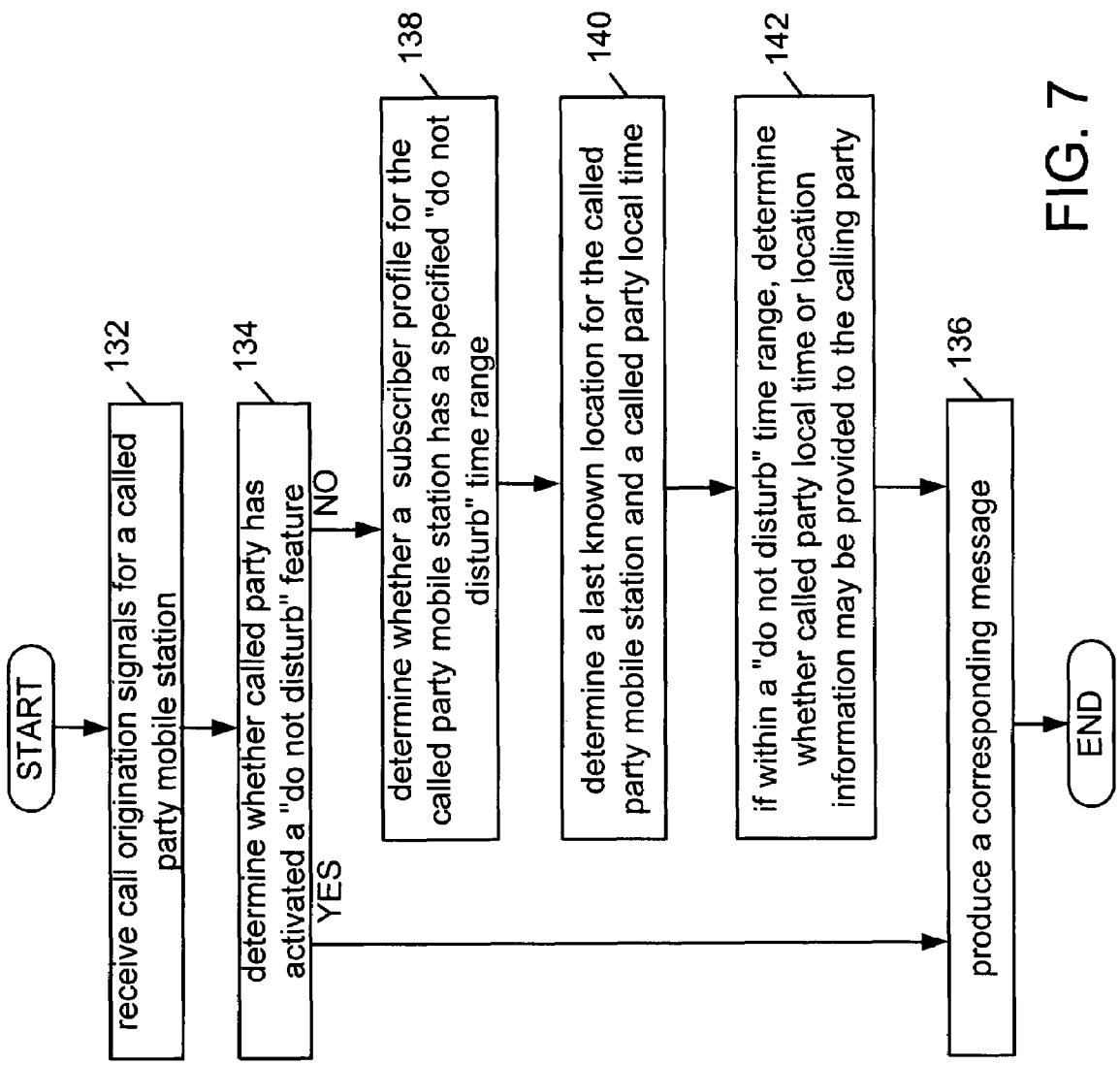

TIME ZONE BASED PHONE SERVICES

TECHNICAL FIELD OF THE INVENTION

This invention relates generally to wireless communication systems and, more particularly, to time based call processing.

DESCRIPTION OF RELATED ART

Initial wireless voice networks, including Advanced Mobile Phone Service (AMPS), Time Division Multiple Access (TDMA), including North American TDMA and Global System for Mobile Communications (GSM) networks, were used to carry wireless calls for a limited number of users and primarily only for voice calls. The original networks are being replaced by newer wireless data-only or data-centric networks, as well as mixed data and voice networks as the wireless technology grows in popularity. The structure and operation of wireless communication systems are generally known. Examples of such wireless communication systems include cellular systems and wireless local area networks, among others. Equipment that is deployed in these communication systems is typically built to support standardized operations, i.e., operating standards. These operating standards prescribe particular carrier frequencies, modulation types, baud rates, physical layer frame structures, medium access control (MAC) layer operations, link layer operations, signaling protocols, etc. By complying with these operating standards, equipment interoperability is achieved.

Multiple access modulation techniques are some of the most efficient techniques for utilizing a radio frequency (RF) spectrum. Examples of such modulation techniques include TDMA, frequency division multiple access and Code Division Multiple Access (CDMA). CDMA modulation employs a spread spectrum technique for the transmission of information. A spread spectrum system uses a modulation technique that spreads a transmitted signal over a wide frequency band. This frequency band is typically substantially wider than the minimum bandwidth required for transmitting the signal. The spread spectrum technique is accomplished by modulating each baseband data signal to be transmitted with a unique wideband spreading (Walsh) code. Using this technique, a signal having the bandwidth of only a few kilohertz can be spread over a bandwidth of more than a megahertz. A particular receiver then determines which signal was intended for that receiver by the unique Walsh code in the signal. The signals at that frequency, without the particular spreading code intended for the particular receiver, appear as noise to that receiver.

In a cellular system, a regulatory body typically licenses a frequency spectrum for a corresponding geographic area (service area) that is used by a licensed system operator to provide wireless service within the service area. Based upon the licensed spectrum and the operating standards employed for the service area, the system operator deploys a plurality of carrier frequencies (channels) within the frequency spectrum that support the subscriber units within the service area.

In cellular systems, a plurality of base stations is distributed across the service area. Each base station services wireless communications within a respective cell. Each cell may be further subdivided into a plurality of sectors. In many cellular systems, e.g., GSM cellular systems, each base station supports forward link communications (from the base station to subscriber units) on a first set of carrier frequencies, and reverse link communications (from subscriber units to the base station) on a second set of carrier frequencies. The first set and second set of carrier frequencies supported by the base station are a subset of all of the carriers within the licensed frequency spectrum. In most, if not all, cellular systems, carrier frequencies are reused so that interference between base stations using the same carrier frequencies is minimized and system capacity is increased. Typically, base stations using the same carrier frequencies are geographically separated so that minimal interference results. In other cellular systems, such as CDMA systems, a single frequency is used to carry code divided communications.

Traditional wireless mobile networks include Mobile Station Controllers (MSCs), Base Station Controllers (BSCs) and Base Station Transceiver Sets (BTSs) which jointly operate to communicate with mobile stations over a wireless communication link. The BSCs and BTSs collectively are referred to as BSs or base stations. To establish a wireless communication link in traditional wireless voice networks, the MSC communicates with the BSC to prompt the BTS to generate paging signals to a specified mobile station within a defined service area typically known as a cell or sector (a cell portion). The mobile station, upon receiving the page request from the BTS, responds to indicate that it is present and available to accept an incoming call. Thereafter, the BS, upon receiving a response from the mobile station, communicates with the MSC to advise it of the same. The call is then routed through the BS to the mobile station as the call setup is completed and the communication link is created. Alternatively, to establish a call, a mobile station generates call setup signals that are processed by various network elements in a synchronized manner to authenticate the user as a part of placing the call.

One example of a system that is presently being deployed with voice and data capabilities is the cdma2000 network. The cdma2000 network, however, is developed from the IS-95 networks that were optimized for voice transmissions and therefore is not optimized for transmitting data even though its data transport capability is significantly improved from prior art networks and systems. More formally, the 1xRTT standard defines CDMA operation for data transmissions.

Wireless communication service providers, as well as Internet service providers, are increasingly working together to provide seamless end-to-end call connectivity across the various platforms to enable users to establish point-to-point connections independent of terminal type and location. Traditionally, however, voice networks have paved the way for the creation of data networks as users loaded the voice networks trying to transmit data, including streaming data (video and audio). Initially, traditional Public Switched Telephone Networks (PSTNs) were used for data transmissions but have been largely supplanted by packet data networks, including various versions of the Internet. The next generation of cellular networks presently being developed is being modified from traditional systems to create the ability for mobile stations to receive and transmit data in a manner that provides greatly increased throughput rates. For example, many new mobile stations, often referred to as mobile terminals or access terminals, are being developed to enable a user to surf the web or send and receive e-mail messages through the wireless channel, as well as to be able to receive continuous bit rate data, including so called "streaming data". Accordingly, different systems and networks are being developed to expand such capabilities and to improve their operational characteristics.

All of the foregoing discussion illustrates the technical sophistication of the wireless infrastructure that has improved our ability to reach others irrespective of location and time. Today, individuals are not required to be at a known location to be reached. The above described technology has thus separated communications from traditional restraints of location and time.

While cellular phone networks have significantly improved our ability to communicate and to reach others when necessary, certain inconveniences may also be noted. For example, phone calls are often received at inconvenient times, such as in the middle of the night, at dinner, or during an important meeting. In many cases, the calling party simply does not know what the called party is doing at a particular time and thus interrupts the called party unintentionally and undesirably. Because a PSTN telephone number is physically assigned to a specific location, a local time for the called party may be determined. An area code of a wireless number, however, serves no useful information about a called party's present location. This problem is particularly acute for users that travel internationally. If, for example, two individuals are based in the same area and have similar area codes for their cellular phones, the cellular network will automatically route the call to the current location of the called party regardless of actual location. Thus, if the called party is in a different time zone, the call may be routed to the called party and may ring at an inopportune time (i.e., in the middle of the night). What is needed, therefore, is a system and method for reducing the likelihood that a calling party would inadvertently call and wake a called party in the middle of the night or otherwise call the called party at a time at which the called party does not wish to be disturbed except in cases of emergency. This need exists not only for traditional voice phone services, but also for data-capable mobile terminals that are under development.

BRIEF SUMMARY OF THE INVENTION

A method and apparatus provides the capability for a called party to specify whether a call is to be automatically routed or whether the calling party is required to take additional action to route a call during a time the called party does not wish to be disturbed. Additionally, a capability is provided for a calling party to selectively specify whether a calling party is allowed to receive the called party's local time. If the local time is within a specified time range (a "do not disturb" time range specified in advance) at a time that the calling party seeks to reach the called party, a message is played to the calling party to advise the calling party that the call is only to be routed for emergencies and, in one embodiment, to advise the calling party of the local time for the called party. In one embodiment of the invention, the calling party is given the option of leaving a message or continuing with the call in the case of an emergency. The message delivered to the calling party may be one that is generated by an Interactive Voice Response (IVR) unit or by a Short Message Service (SMS) server or any other known message delivery device. In either case, based upon the calling party's response to the message, the inventive method and apparatus results in the cellular network either taking a message for the called party or routing the call to the called party. The specified time range may be specified by the network or may be specified in a subscriber profile in a Home Location Register (HLR).

As an additional aspect of the present invention, the method and apparatus also provide for merely enabling an individual to determine a local time for an entered area code or country code or for a last known location for a mobile station to determine a called party's local time. Moreover, if the calling party enters his or her local time, the inventive method and apparatus provide for calculating a corresponding local time for a specified country code or area code or last known location of the called party.

In order to achieve the desired functionality described above, an HLR includes a database that maps time zone information to country codes, area codes and switch IDs. Accordingly, as a mobile switching center queries the HLR to determine a location of a called party, the HLR examines a subscriber profile for the called party and further examines and determines a local time for the called party based upon a last known location to determine whether the call should be routed ordinarily or whether a specified message should be delivered to the calling party. Accordingly, if the call is to be routed as normal, the HLR operates as normal and merely provides the required information to the MSC to facilitate the routing of the call. If, however, a local time for the called party is within the specified range, for example, as specified in the subscriber profile, the HLR generates a message number to the MSC to prompt the MSC to communicate either with the SMS server or the IVR unit to generate the specified message. Further, the HLR also transmits a local time value as a parameter for the specified message. Accordingly, one of the SMS server or the IVR unit will generate the specified message and will include the parameter provided by the MSC to inform the calling party of a local time for the called party.

Variations of the invention, and specifically the inventive HLR, provide for additional functionality. For example, the HLR may, upon merely receiving a country code, an area code or a cell phone number, provide a local time value to an MSC which, in turn, prompts the generation of one of an IVR message or SMS message (in conjunction with the corresponding server) to deliver requested local time information to a calling party. Moreover, if the calling party further provides a time value as entered through a specified user protocol, then an HLR calculates a corresponding local time for the specified area code or country code or the time at the last known location for a specified user, and delivers the same to the MSC for delivery to the calling party. As another aspect of the present invention, the described inventive functionality may also be fully provided by a Visitors' Location Register (VLR) whose operation is known by those of average skill in the art. Generally, though, the VLR provides HLR functionality (or a subset thereof) for a specified number of users in a geographic area served by an associated MSC.

Similarly, the invention may also be implemented substantially in an MSC. More specifically, an HLR would continue to include (or communicate with) a database that maps local times to switches, area codes and country codes, as well as stores subscriber information. For time zone-related services subscribers, the HLR provides necessary time zone-related service parameters to the calling party MSCs wherein the calling party MSCs perform all associated logic.

BRIEF DESCRIPTION OF THE SEVERAL VIEWS OF THE DRAWINGS

FIG. 4 is a flowchart illustrating a method according to one embodiment of the present invention;

FIG. 5 is a flowchart illustrating an alternate aspect of one embodiment of the present invention;

FIG. 7 is a flowchart illustrating an alternate embodiment of the present invention.

DETAILED DESCRIPTION OF THE INVENTION

Figure 1:
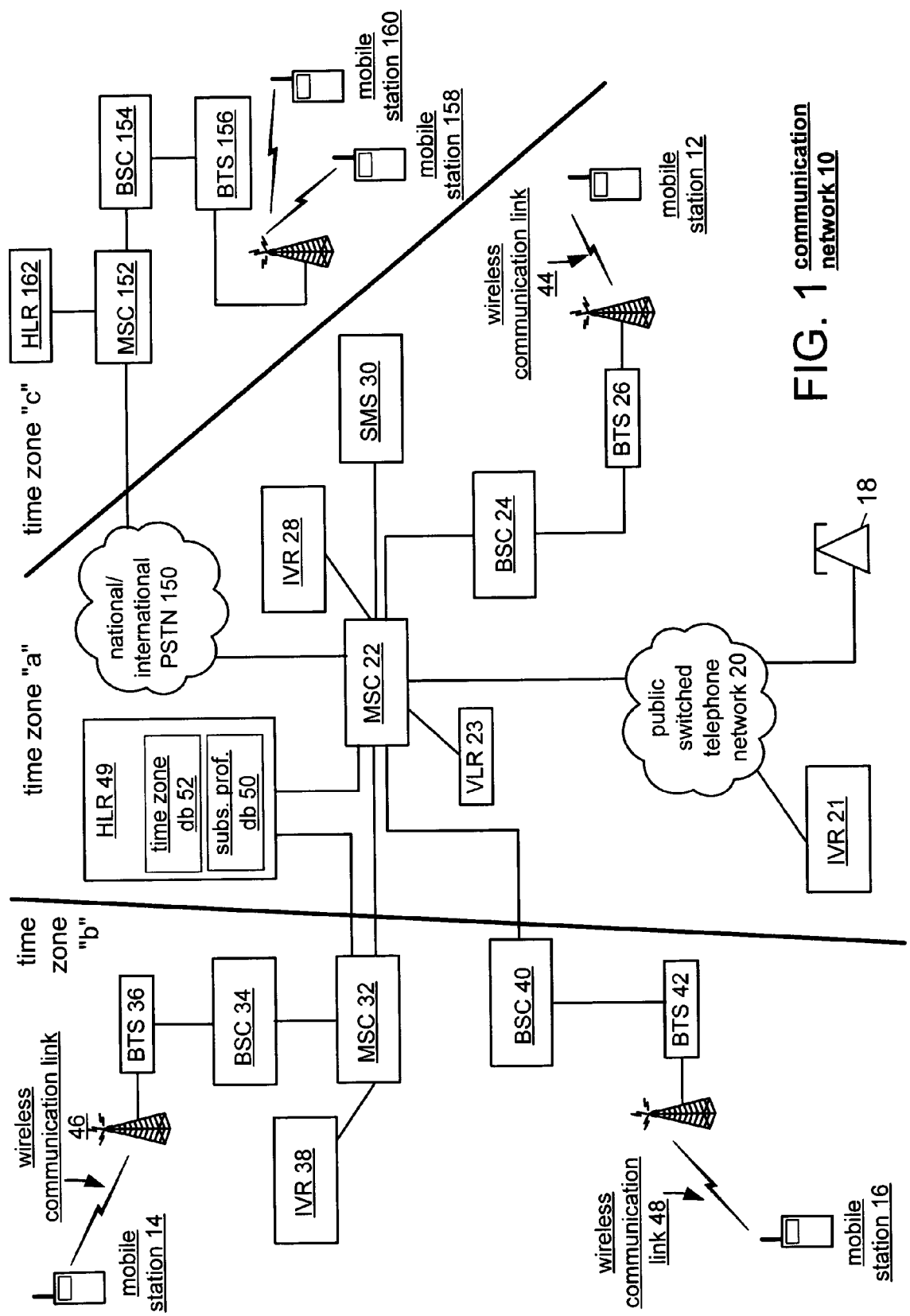
FIG. 1 is a functional block diagram of a communication network formed according to one embodiment of the present invention.

FIG. 1 is a functional block diagram of a communication network formed according to one embodiment of the present invention. A communication network 10 is configured to allow a plurality of mobile stations, such as mobile stations 12, 14 and 16, to communicate with each other regardless of geographic location as long as they are located within an area within which cellular service is provided. Additionally, any one of the mobile stations 12, 14 or 16 may communicate with a PSTN telephone, such as PSTN landline phone 18. As may be seen, PSTN landline phone 18 is coupled to communicate through PSTN 20 that, in turn, is coupled to a Mobile Switching Center (MSC) 22, which serves to couple mobile stations to the landline phones coupled to PSTN 20.

As is known by one of average skill in the art, MSCs, such as MSC 22, provide network switching for cellular traffic according to a mobile station's location. More specifically, each MSC is coupled to at least one Base Station Controller (BSC) which, in turn, is coupled to at least one Base Station Transceiver Set (BTS). Here, MSC 22 is coupled to BSC 24 which, in turn, is coupled to BTS 26. MSC 22 further is coupled to an Interactive Voice Response (IVR) unit 28 and to a Short Message Service (SMS) server 30. Similarly, in the network of FIG. 1, an MSC 32 is coupled to a BSC 34, which, in turn, is coupled to a BTS 36. The MSC 32 further is coupled to an IVR unit 38. MSC 22 also is coupled to a BSC 40 which, in turn, is coupled to a BTS 42.

Mobile station 12 communicates with other mobile stations by way of BTS 26 and BSC 24 while within an area served by BTS 26. Similarly, mobile station 14 communicates with the cellular network through BTS 36 and BSC 34 and mobile station 16 communicates through BTS 42 and BSC 40. To facilitate these communications, a wireless communication link 44 couples mobile station 12 to BTS 26, while a wireless communication link 46 couples mobile station 14 to BTS 36 and wireless communication link 48 couples mobile station 16 to BTS 42. Further, each of the MSC's, such as MSC 22 and MSC 32, are coupled to a Home Location Register (HLR) 49 that provides location tracking, among other functions, for the plurality of mobile stations within communication network 10.

Additionally, MSC 22 is also coupled to communicate with an MSC 152 by way of a national or international public switched telephone network (PSTN) 150. MSC 152 is further coupled to a BSC 154 which in turn is coupled to a BTS 156. BTS 156, in the example of FIG. 1, is communicatively coupled to mobile station 158 and to mobile station 160. An HLR 162 is coupled to MSC 152. MSC 152 is in a different time zone from MSC 22 and is a serving MSC for mobile station 158 in its current location. For the purposes of the example of FIG. 1, mobile station 158 is originally a subscriber of MSC 22 and HLR 49 but has traveled within a region served by MSC 152 and HLR 162. Mobile station 160, on the other hand, is originally a subscriber of MSC 152 and HLR 162.

In operation, the present invention addresses the long felt need for managing call setup in a manner that accounts for a called party location prior to automatically routing a call and completing a call connection as performed by prior art networks. When a calling party wishes to place a call to another individual's mobile station, the calling party will enter the called party's phone number on its keypad and will typically depress a "talk" or "send" button to prompt the mobile station to initiate a call with BSC 24 by way of BTS 26. Thus, call setup signals are transmitted between BTS 26 and mobile station 12. BSC 24 receives, among other information, a called party's phone number for the party that the user of mobile station 12 (the calling party) is trying to reach. BSC 24 produces the called party's number to MSC 22. MSC 22 then examines a local Visitors' Location Register (VLR), such as VLR 23, to determine if the called party is a mobile station presently being served by MSC 22. Thus, for example, if mobile station 12 were calling mobile station 14, and mobile station 14 was a subscriber of HLR 48, VLR 23 would not contain current user information of mobile station 14 since mobile station 14 is presently being served by MSC 32. Accordingly, MSC 22 would produce the called party's number in a location update request signal to HLR 49 to determine, among other items, the serving MSC for the called party.

Once MSC 22 communicates with HLR 49 to determine the serving MSC for the called party of mobile station 16 is MSC 32, under ordinary operation MSC 22 would immediately route the call to mobile station 14 by way of MSC 32, BSC 34, BTS 36 and wireless communication link 46. Here, however, before transmitting the mobile station 14 serving MSC information to MSC 22, HLR 49 examines a subscriber profile database 50 to determine time zone-related features of mobile station 14. Alternatively, an MSC, such as MSC 22, would generate a flag to HLR 49 to receive time zone routing information. The time zone routing information can comprise a local time for the called party, a "do not disturb" time range or merely that the called party is not to be disturbed except in specified situations, such as an emergency. In either embodiment, HLR 49 further examines the contents of a time zone database 52 to determine a local time for mobile station 14. For example, if mobile station 14 is in time zone "b" while mobile station 12 is in time zone "a", then, based upon the local time for mobile station 14, and according to specified subscriber profile information stored within subscriber profile database 50, HLR 49 either produces routing information to MSC 22 or specified message information for a message that should be generated to the calling party of mobile station 12.

In a first embodiment of the invention, HLR 49 generates an IVR message number for a message that should be generated to the calling party of mobile station 12. Additionally, in the described embodiment of the invention, HLR 49 also generates a message parameter to MSC 22 for delivery with the specified message. For example, if, according to the subscriber profile, the local time for mobile station 14 is within a specified range (i.e., a "do not disturb" range), HLR 49 will generate a message number to prompt MSC 22 to communicate with IVR 28 to prompt IVR 28 to play a specified message corresponding to the message number and the local time for mobile station 14. Of course, the words of the message are subject to implementation. Generally, though, the purpose of the message is to advise the calling party of the local time of the called party. In one embodiment, the message number identifies a message that states that the called party does not wish to be disturbed unless it is an emergency. MSC 22 then communicates with IVR 28 to play the specified message with the called party's local time by way of MSC 22, BSC 24, BTS 26, and wireless communication link 44 to the calling party of mobile station 12. The called party's local time is the parameter generated by the IVR to MSC 22 which, in turn, produces the parameter to the IVR to enable IVR 28 to include the local time for the called party in the message. The message, in the described embodiment, prompts the calling party to take further action prior to the call being completed. For example, the message may prompt the calling party of mobile station 12 to indicate in a specified manner (saying or dialing a specified response) that the call is to be routed or that the calling party wishes to leave a message for the called party. Alternatively, a message is merely played to the calling party of mobile station 12 prior to completing the call setup. In such an embodiment, it is up to the calling party to hang up to terminate the call routing before it is completed. The above-described operations are for a call that is being placed from the calling party of mobile station 12 to the called party of mobile station 14. Other aspects of the present invention include providing a system and method for merely informing the calling party of a local time in a particular geographic location. For example, in one embodiment of the present invention, a calling party may enter at least one of a country code, an area code, or a cell phone number, and press a specified button to prompt the cellular network to deliver a message back to the calling party defining a corresponding time. For example, if the calling party enters an area code, a country code of a particular location, or a cell phone number, and depresses the specified button, the mobile station transmits a "local time request" signal to the MSC with the entered information. The MSC, for example MSC 22, upon receiving the "local time request" signal, communicates with HLR 49 to receive a message that specifies a local time for the specified area code and/or country code or last known location for an entered cell phone number. The MSC 22 then provides a message number and parameter to prompt a message delivery device (e.g., an IVR or an SMS server) to deliver the local time for the requested country code or area code or cell phone number (assuming the cell phone associated subscriber features do not specify that a local time is not to be provided).

As an alternate aspect of the present invention, if the calling party of mobile station 12 further enters a time value (relative to local time for the calling party), as specified through a defined user protocol, MSC 22 will not only forward the area code and/or country code to HLR 49, but also the specified time value. Accordingly, HLR 49 will determine a difference between a calling party's local time and a local time value for the entered nation code, area code or cell phone number, e.g., for and will then determine a difference between the local time for the calling party for mobile station 12 and the specified time and will provide a response to MSC 22 defining the corresponding time local time for the specified nation code, area code or cell phone number. The MSC 22 then generates a message to the calling party of mobile station 12 and transmits the message received from a message delivery service through BSC 24, BTS 26 and wireless communication link 44 to deliver a message that includes a time value that corresponds to a local time of the nation code, area code or cell phone number in relation to the specified local time entered by the calling party of mobile station 12.

Another aspect of the present invention relates to the type of message that is generated for playback to the calling party. For example, if based on a mobile station ID, MSC 22 (and/or HLR 49) determine that mobile station 12 is SMS-capable, then the invention may include generating SMS messages containing the specified prompts and/or information rather than IVR 28 generated aural messages. Thus, in one embodiment of the invention, HLR 49, upon determining that mobile station 12 is SMS message-capable, generates a message ID relating to a specified SMS message, as well as a parameter for insertion therein. The MSC 22, upon receiving the message and parameter from HLR 49, produces the same to SMS 30. The SMS 30 then generates an SMS text message, including the inserted parameter (e.g., a local time for the called party) and produces the SMS message to MSC 22 for delivery to mobile station 12 by way of BSC 24, BTS 26, and wireless communication link 44.

The above example is for a called party (mobile station 14 or mobile station 158) that is roaming and is being served by a different MSC than the one for the calling party. Thus, MSC 22 serves mobile station 12 (the calling party) while MSC 32 serves mobile station 14 (the called party) and MSC 152 serves mobile station 158. While HLR 49 serves mobile stations 12 and 14, HLR 162 is serves mobile station 158 and 160. The above described operation generally applies for any called party mobile station. For example, the called party may be similar to mobile station 160 that is being served by a remote MSC (here, MSC 152) and is an original subscriber of MSC 152 and HLR 162. Alternatively, the called party may be similar to called party mobile station 158 which is roaming in an area served by MSC 152 and HLR 160 or may be similar to mobile stations 12, 14 or 16. A typical example of mobile station 160 is a mobile station of an individual of a different nationality that is being called in his or her home region. The present invention applies with equal force for all of the exemplary types of called parties represented by mobile stations 12, 14, 158 and 160.

The called party, however, may also be one, such as mobile station 16, that is served by the same MSC 22 but a different serving BSC, here BSC 40. Under normal operation, MSC 22 communicates with VLR 23 to determine that mobile station 16 is still being served by MSC 22. Accordingly, MSC 22 would ordinarily route the call to mobile station 16 by way of BSC 40, BTS 42, and wireless communication link 48 immediately. The operation for routing and setting up such calls is known to one of average skill in the art.

According to the present invention, VLR 23 would evaluates a local time for a mobile station, such as mobile station 16, and determines whether to route the call to the mobile station or whether a message should be generated to be played back to the calling party. Generally, VLR 23 includes the same functionality as HLR 49 but only for mobile stations that are currently within an area served by MSC 22. With respect to mobile stations 12 and 14, however, the time zone difference may be any amount because they are served by different MSCs. Thus, mobile station 14 may be in Asia when being called by either mobile station 12 or PSTN landline phone 18.

As may be seen, mobile station 12 is located within time zone "a", while mobile station 16 is located within time zone "b". Such geographical, and more particularly, time zone displacement between mobile stations served by one MSC, here MSC 22, is possible, though one would expect the time zone difference to merely be one hour (or only a few hours) as the geographic area served by an MSC, such as MSC 22, is limited.

As each MSC maintains a clock with its time relative to Greenwich Mean Time as well as the local time, alternative approaches to receiving a local time for the called party are possible. For example, in one embodiment of the invention, each MSC communicates with the serving MSC of the called party to determine the local time of the called party as a part of determining how to process a call according to the present invention. Additionally, any given MSC may modify its table of BTSs to track a local time for the BTSs. Accordingly, if a BTS is in a different time zone, the serving MSC may readily determine the same for the purposes of the invention herein.

In the above-described embodiment, the HLR determines whether a message is to be played to a calling party because the local time for the called party is within a "do not disturb" range. Alternatively, the HLR merely produces a calculated called party local time to the calling party MSC along with called party subscriber information. Here, the MSC performs all logic associated with the time zone based delivery services and the HLR merely provides necessary time and subscriber feature information as described herein. The called party subscriber information, in one embodiment, includes at least one of whether the called party has activated the "do not disturb" mode, whether the local time for the called party (or the called party's last known location) is within a "do not disturb" time range or merely an indication of the called party's "do not disturb" time range. One example of this embodiment is illustrated in greater detail in FIG. 2 and in the accompanying text.

As an additional aspect of the present invention, a switch (not shown) within PSTN 20 may provide the same functionality described above for called parties with cellular phones as well as called parties with landline phones. While a calling party may readily, with a little research, determine a local time for any landline phone with a reasonable degree of accuracy (1 or 2 hours), it would be a helpful service to provide time zones for called party numbers to allow the calling party to avoid having to perform the necessary research and corresponding math to determine the local time for a called party's landline number. Moreover, the service is especially applicable for calls to mobile stations by landline-based calling parties. Accordingly, the invention includes an IVR 21 coupled to a switch within PSTN 20 to play specified messages as described above for the cellular networks.

If a called party mobile station, for example, mobile station 158, is turned off and travels to the region served by MSC 152, mobile station 158 will exchange communication signals with BTS 156 once it is powered on. Response to establishing its presence with BTS 156, BTS 156 communicates with MSC 152. MSC 152 will communicate back to its HLR 49 regarding MSI 58. HLR 49 will transmit a "cancel location" message for MS 158 to MSC 22. MSC 152 further makes an entry into its VLR (not shown here in FIG. 1) to grant service to mobile station 158. As a part of the communications between MSC 22 and MSC 152, MSC 22 and/or HLR 49 forward subscriber feature information relating to the "do not call" service to enable MSC 158 to process calls according to the described embodiments of the present invention. Accordingly, MSC 158 may now originate and received calls while it is in an area served by MSC 152. The described aspects of the present invention are then operable for mobile station 158 whenever it receives a call.

For example, if a call is placed to mobile station 158 by any mobile or PSTN landline phone, the call is first routed to MSC 22 and HLR 49. HLR 49 redirects the call to MSC 152 which, in turn, examines its VLR to determine that the call should be routed to mobile station 158 by way of BTS 156 consistent with the present invention.

Figure 2:
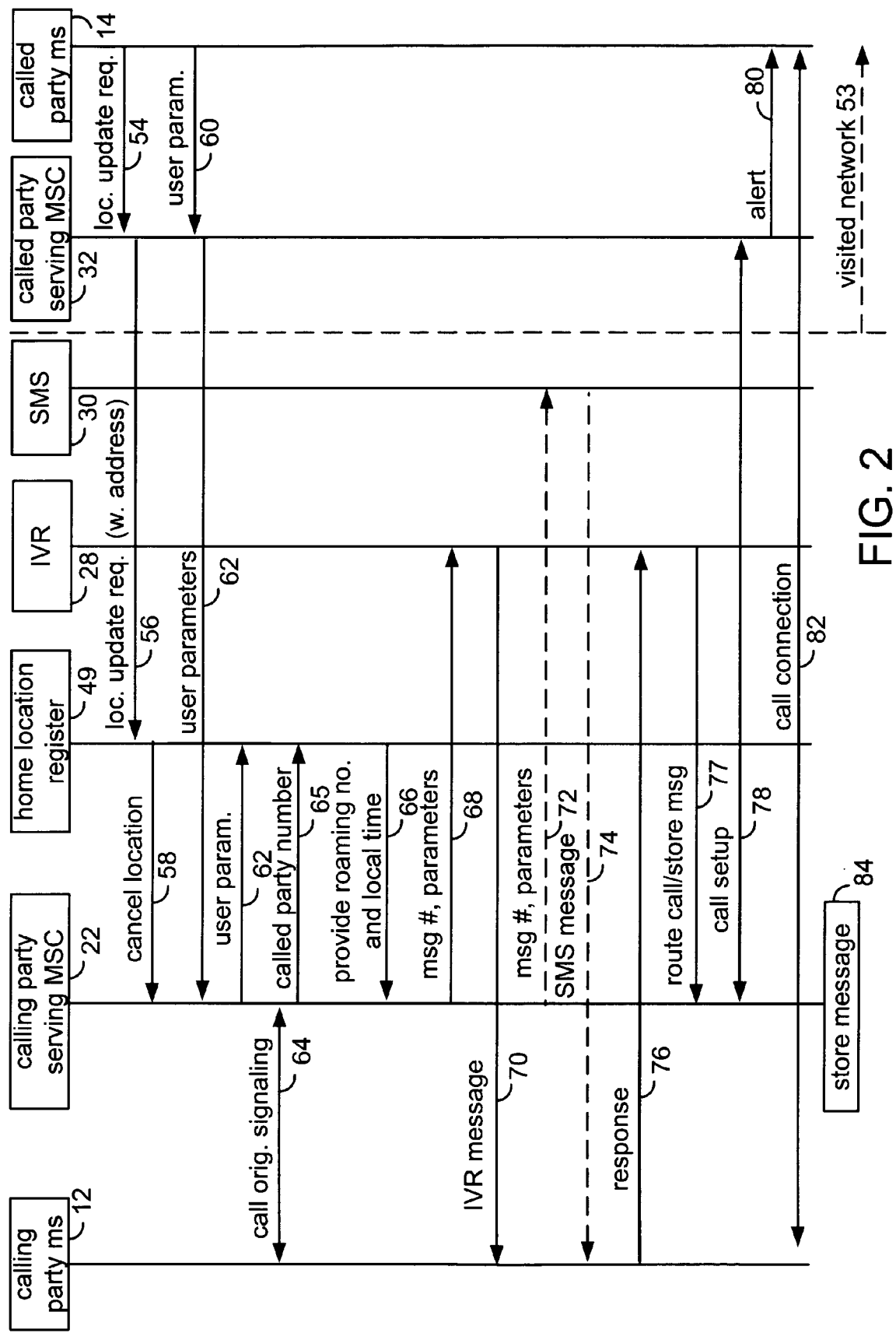
FIG. 2 is a signal sequence diagram that further illustrates operation according to one embodiment of the present invention.

FIG. 2 is a signal sequence diagram that further illustrates operation according to one embodiment of the present invention. Generally, it should be understood that the call signaling described herein may readily be modified according to network topologies and associated protocols for establishing a call. More specifically, the following steps relate to application of the invention to a communication network in which, as a part of call setup, a serving MSC (or Gateway-MSC) determines a local time for a called party as a part of routing a call. Then, according to one of called party user subscriber features or network based protocols, the serving MSC initiates an interactive device to communicate with the calling party to deny call routing or to advise the calling party that the called party is not to be disturbed.

In one embodiment of the invention, in a situation in which the called party is a mobile station that has traveled into a visited network 53, the called party initially must register its location to be reachable. Accordingly, the called party, here MS 14, initially generates a location update request 54 to a local (serving) MSC, which here in the described embodiment, is serving MSC 32. MSC 32 a location update request containing an address of MSC 32 to a home location register (HLR) 49. HLR 49, in response to receiving the location update request, updates its records as to the serving MSC for called party MS 14. HLR 49 further generates a cancel location message 58 to the called party's home MSC which, in this example, is also calling party MSC 22.

At any time, a user may define or update user parameters relating to the inventive "do not disturb" feature and to the time zone based delivery of services as disclosed herein. In the example of FIG. 2, called party mobile station 14 updates the user parameters after registering its location with called party serving MSC 32. The user parameters, in one embodiment, specify a "do not disturb" time range. In another embodiment, the user parameters include an indication that the user is merely activating or de-activating the "do not disturb" feature to prompt the MSC to initiate a "do not disturb" message to the calling party regardless of the called party time in a manner that allows the calling party to continue with the call in the event of an emergency.

Thus, MS 14 produces user parameters 60 to called party serving MSC 32. The user parameters specifically relate to the time zone invention described herein and include the ability for the user to specify a "do not disturb" time range or to merely activate a "do not disturb" feature as disclosed herein. The "do not disturb" time range, more specifically, lists a beginning time and an ending time in which calls are not to be routed with the exception of emergencies. MSC 32 then provides received user parameters 62 to HLR 48.

Thereafter, whenever calling party MS 12 initiates a call to the called party of MS 14 by dialing the called party number and depressing a button to initiate the call ("send" or "talk" for example), call origination signaling 64 is transmitted between calling party MS 12 and a calling party serving MSC 22. Such call origination signaling 64 provides a called party number, a mobile station ID and other similar information as is known by one of average skill in the art.

Responsive to receiving the call origination signaling 64, MSC 22 produces the called party number in a location request signal 65 to HLR 49 to query HLR 49 for location and routing information. Ordinarily, HLR 49 is aware of the identity of serving MSC (here, MSC 32) for the called party, having previously obtained a Temporary Location Directory Number (TLDN) from the serving MSC 32 in location update request signal 56 from MSC 32. Thus, HLR 49 (or an associated VLR) responds by providing the TLDN to MSC 22 to enable MSC 22 to complete the call setup In one embodiment of the invention, the calling party MSC 22 (which is also the home MSC for called party 32 who is presently in a visited network 53) sets a "time zone services" flag based upon a called party's profile information received from an HLR such as HLR 49. In the described embodiment, the time zone services flag is produced to the HLR with the query for routing information.

For the purpose of this example, HLR 49 determines that the local time for the called party by comparing a known location for MSC 32 to an entry in a database upon receiving the time zone services flag with the location update request signal 65. HLR 49 then returns the called party local time to the calling party serving MSC along with routing information in a provide roaming number message 66. The calling party serving MSC then determines that the local time is within a specified "do not disturb" time range or, alternatively, that the called party has activated a "do not disturb" feature. This specified time range may be network specified or may be specified in a subscriber profile for the called party. MSC 22 then produces a message number and the at least one parameter in a signal 68 to IVR 28. The at least one parameter includes the local time for the called party. IVR 28 then generates an IVR message that corresponds to the message number and includes the at least one parameter in an IVR message 70. IVR message 70 is generated by IVR 28 and is delivered to the calling party MS 12 by way of MSC 22 (and a serving BSC and BTS not shown here in FIG. 2). In an alternate embodiment, MSC 22 merely produces a message number to IVR 28 to prompt it to merely play a "do not disturb" message without specifying a local time for the called party.

As an additional aspect of the invention, the MSC 22 prompts a message to be generated from a short message service (SMS) server if an SMS server is available and if the calling party MS 12 is SMS service capable. Accordingly, instead of producing a message number and the at least one parameter in signal 68 to IVR 28, MSC 22 produces a message number and the at least one parameter in a signal 72 to an SMS server 30. SMS server 30 then generates a corresponding SMS message including the at least one parameter in an SMS message 74. The SMS message 74 is delivered to the calling party MS 12 by way of MSC 22 (and the serving BSC and BTS).

Generally, the message produced by either IVR 28 or SMS server 30 include a specified message that includes the local time. In an alternate embodiment which simplifies overall operation, the HLR merely transmits a message number to MSC 22 to prompt either IVR 28 or SMS server 30 to produce a "do not disturb" message without specifying the actual time. The described embodiments, however, specifically include the called party local time value if the "do not disturb" message is being generated because a local time for the called party is within a specified "do not disturb" time range. Otherwise, if the "do not disturb" has been activated by the called party prior to the call being initiated by the calling party, the "do not disturb" message is generated without a local time value.

In one embodiment of the present invention, the message, whether generated by SMS server 30 or IVR 28, prompts the calling party to respond indicating whether the calling party wishes to leave a message or to have the call routed. Thus, if the calling party selects to have the call routed, as illustrated in a response 76 to IVR 28, IVR 28 generates a "route call" signal 77 to MSC 22 to prompt MSC to route the call (assuming that is the calling party's response). Thereafter, call setup signals are generated to setup a call between MSC 22 and MSC 32 for the roaming called party MS 14, as shown in call setup signaling 78. MSC 32 then generates an alert signal 80 to the called party's mobile station, here mobile station 14, to prompt mobile station 14 to ring to alert the called party to complete the connection. Upon the called party acknowledging the call, a call connection 82 is established between calling party MS 12 and called party MS 14 by way of MSC 22 and MSC 32 as may be seen.

If the calling party selected, instead, to store a message, then MSC 22 initiates the storing of a message in a known manner as shown at a store message block 84. The message may be stored by a message recorder, IVR 28 or any other known device for storing voice mail and other messages.

The above discussion of FIG. 2 generally illustrates operation for a calling party communication with a mobile station. The invention may be implemented for all phone networks, however. Accordingly, the corresponding message flows would be modified slightly as is known by one of average skill in the art. For example, if the calling party is originating the call from a landline phone within the public switched telephone network (PSTN), MSC 22 is replaced by a gateway MSC (G-MSC) which generally performs the functionality described for MSC 22.

Additionally, the signal flows of FIG. 2 illustrate operation of the invention in a situation in which a call is being placed to the called party either during a "do not disturb" time range or at a time that the called party has activated the "do not disturb" feature (regardless of local time). As will be described in greater detail below, the invention further includes merely providing a time value based upon an entry of one of a national code, an area code and a called party number. Thus, for this aspect of the invention, the call flows illustrated in FIG. 2 may be modified to prompt the various network elements to provide the requested local time for the requested national code, area code or called party number. Examples of changes to the network flows include a specified message number by MSC 22 to either IVR 28 or SMS server 30 to prompt either interactive device to merely play a message indicating a local time for the requested national code, area code or called party number. The message thus played would be one that would not prompt the calling party to respond and further would not result in a call being routed or message being stored. Additionally, if the message provided by MSC 22 to either IVR 28 or SMS server 30 includes a time value, the responding message would include the local time. As yet another aspect of the invention, if MSC 22 provides a time value to HLR 49 (not necessarily with a location update signal) along with one a requested national code, area code or called party number, HLR 49 calculates a local time value relative to the specified time value and provides the local time to MSC 22. Accordingly, MSC 22 sends the provided time value to one of IVR 28 or SMS server 30 to deliver the calculated relative local time to the calling party.

Figure 3:
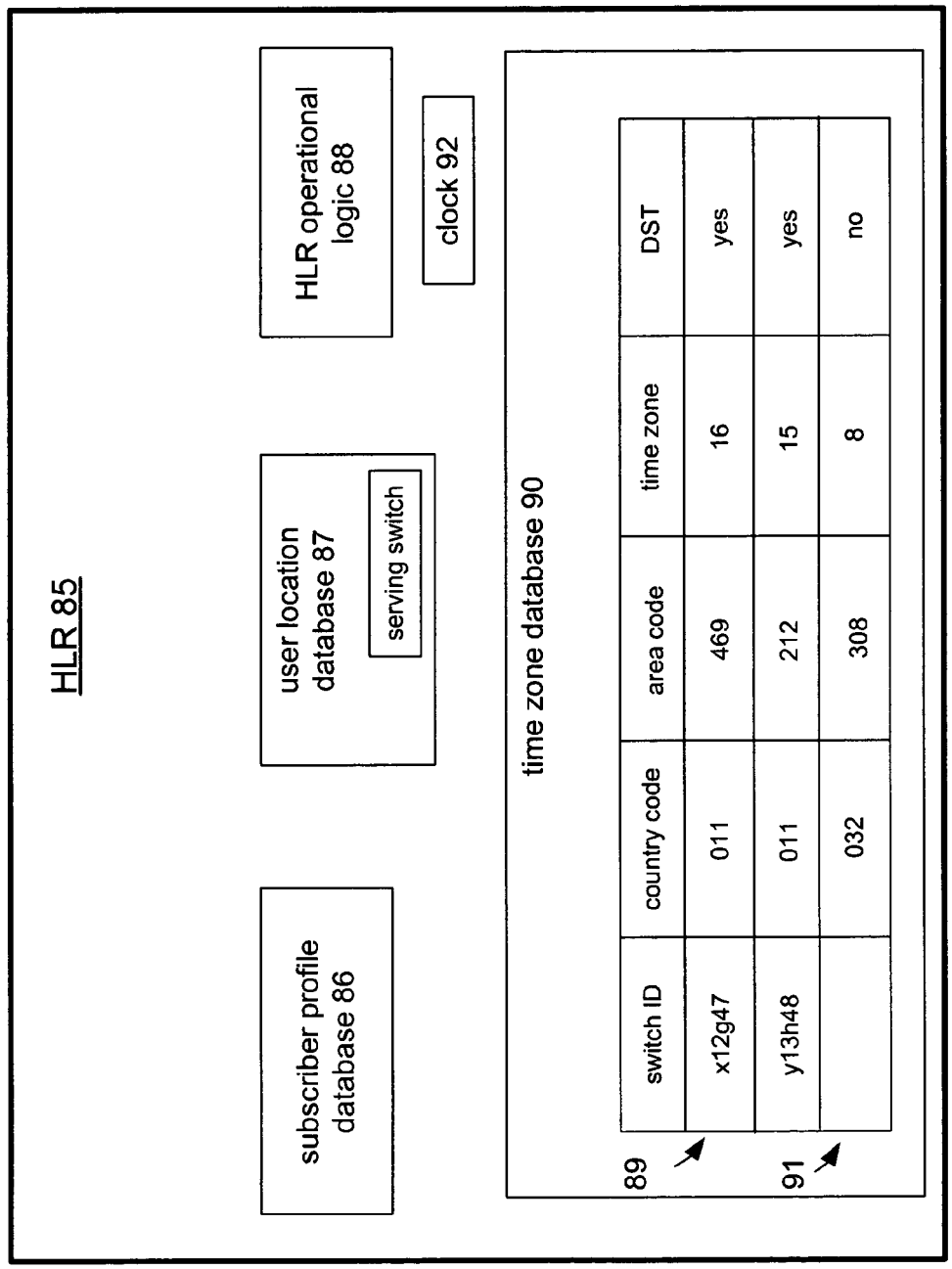
FIG. 3 is a functional block diagram of a Home Location Register (HLR) formed according to one embodiment of the present invention.

FIG. 3 is a functional block diagram of a Home Location Register (HLR) formed according to one embodiment of the present invention. An HLR 85 comprises a subscriber profile database 86, a user location database 87, and HLR operational logic 88. Further, HLR 85 includes a time zone database 90 that maps a specified switch ID to time zone information to enable HLR 85 to determine a future local time. The HLR 85 further includes an internal clock 92.

HLR 85 of FIG. 3, and more particularly, time zone database 90, maps a plurality of different types of information to time zones. For example, as may be seen in FIG. 3, known switch IDs (addresses/TLDNs) are mapped to a particular time zone, as are country codes and area codes. For example, if a routing MSC is routing a call to a switch having a switch ID of "x12g47", as shown in row 89 of time zone database 90, HLR 85 may readily determine that the serving MSC is within time zone 16 (relative to Greenwich Mean Time). Accordingly, HLR 85 may readily calculate the local time for the called party serving MSC, here the MSC having switch ID "x12g47", as it operates according to its defined logic for determining whether to route a call or whether a specified message should be played to the calling party.

For example, if the calling party is placing a call at 10:00 p.m., local time for HLR 85 as indicated by clock 92, HLR 85 determines that the local time for the called party being served by the MSC having switch ID "x12g47" is 11:00 p.m. (assuming for this example that HLR 85 is in time zone 15), then the logic within HLR 85 will prompt HLR 85 to generate a specified message number to the serving MSC for the calling party specifying a local time for the calling party. In the described embodiment of the invention, the specified message would advise the calling party of the local time for the called party or, alternatively, that the local time is one in which the called party does not wish to be disturbed except in emergencies.

The nationality of all switch IDs, international switches, are not always known by HLR 85. However, if a user location database 87 within HLR 85 identifies that the called party is within a switch of a country having a country code 032, for example, then HLR 85 may examine the contents of time zone database 90 to determine the time zone for the switch within country code 032. For example, as shown in row 91 of database 90, area code 308 in the nation having country code 32 is within time zone 8. Thus, according to subscriber profile database 86, HLR 85 is able to determine whether the local time for the dialed country code and/or area code is one in which the called party does not wish to be disturbed unless it is an emergency. More generally, therefore, time zone database 90 of HLR 85, in conjunction with information stored in subscriber profile database 86 and user location database 87, enables HLR 85 to determine whether a message should be delivered or produced to the calling party prior to the completion of call routing by the MSC serving the calling party.

For example, if the calling party is in time zone 16, HLR 85 is in time zone 15 and the called party is within area code 308 in the nation having country code 32, HLR 85 can readily determine that there is a 7 hour difference between its time and the local time for the called party not accounting for daylight savings time. Accounting for daylight savings time, HLR 85 is able to determine, for the sake of example, that the time difference is 8 hours. Accordingly, if the calling party is calling at 5:30 p.m. in time zone 16, it is 4:30 p.m. in time zone 15 where HLR 85 is located, and 12:30 a.m. (7 hours for time zone difference and 1 hour for DST) at the last known location of the called party (in area code 308 of the nation having country code 32).

If 12:30 a.m. is within the called party's "do not disturb" time range, HLR 85 will initiate the transmission of a specified message to the calling party as described herein. As may further be seen, a database 90 enables HLR 85 to perform local time based calculations for the present time and for specified (requested) time values because the database allows HLR 85 to readily determine the difference in local time values on an international basis. This capability, along with the traditional capability of an HLR to determine a mobile station's location facilitates the features of the described embodiments of the invention.

The described embodiments of the invention have included logic for determining a called party's local time, determining whether to play a specified message according to a called party subscriber profile, and processing the call (storing a message or routing the call) according to a calling party response to the message. This logic for achieving the described functionality is but one embodiment of the invention, however. The invention may be simplified or modified in other ways. For example, in one embodiment of the invention, the HLR merely causes a message to be played to a calling party whenever there exists a time zone difference of more than a specified number of hours (e.g., two hours). In this embodiment, it is merely up to the calling party to determine whether the call should be terminated (by hanging up) or allowed to be routed. In another embodiment, the HLR merely causes a message to be played whenever the called party time is within a network specified time range of 10:00 p.m. to 7:00 a.m. As may be seen, therefore, the basic functionality of including a time zone database in an HLR in conjunction with the HLR's capability of determining a location for a called party creates the possibility for many different embodiments of time zone based calling functionality.

FIG. 4 is a flowchart illustrating a method according to one embodiment of the present invention. Initially, a calling party MSC (or G-MSC) receives call origination signals for a called party mobile station (step 94). More particularly, the MSC receives call origination signaling identifying a called party number. The MSC then determines whether a corresponding subscriber profile for the called party mobile station includes a "do not disturb" time range (as an active state or mode), and if so, produces an indication of such to an HLR in a location update request signal (step 96). One aspect of the present invention includes the HLR determining a last known location for the called party mobile station and determining a local time therefor. Accordingly, the MSC then receives last known location information and a local time for the called party (step 98). Thereafter, the MSC determines whether to deliver a message to the calling party to prompt the calling party to hang up or leave a message (step 100). This step includes evaluating the local time for the called party mobile station and, based upon whether the local time for the last known location is within a specified "do not disturb" range, whether the called party's mobile station subscriber profile specifies that the call is not to be setup without generating the specified message to the calling party. Thereafter, the inventive method includes producing a corresponding message (step 102) if the called party's local time is within the "do not disturb" range specified in the subscriber profile. The step of producing a corresponding message more specifically includes generating a message to one of an IVR or an SMS server with a message number and, if appropriate, any corresponding parameters (e.g., a time value that is to be passed on to the calling party either through a voice message from the IVR or a text message from the SMS server.

In an alternate embodiment, the steps of examining the subscriber profile to determine the "do not disturb" time range may be omitted if the "do not disturb" range is operator defined or alternatively if the called party has merely activated the "do not disturb" feature. Once the message has been generated, however, the MSC serving the calling party will eventually receive the calling party response and will either store the message or route the call accordingly.

FIG. 5 is a flowchart illustrating an additional aspect of one embodiment of the present invention. Initially, a home location register receives at least one of a country code, an area code and a called party cell phone number (step 110). Thereafter, the method includes determining a local time for the country code, area code or called party cell phone number (step 112). In order to determine a local time for the country code, area code or called party cell phone number, the invention includes examining a time zone database, such as time zone database 90 of FIG. 3, to determine a local time for the entered country code, area code or called party cell phone number provided by the calling party. In one embodiment of the invention, one of a dedicated button or sequence of keys is provided to enable the calling party to specify that a call is not being dialed and that the calling party merely seeks to determine a local time for a country code, an area code or a location of a called party cell phone.

In one embodiment of the invention, the HLR optionally receives a specified time value (step 114) and determines a corresponding time value for the entered country code or area code (step 116). Thus, the HLR determines a difference in time zones between the specified country code, area code or last known location of the called party cell phone and a location of the calling party. This determined difference is then added (subtracted if lagging in time) to the specified time value to determine a calculated time that accounts for time zone differences for a requested time value that is local to the calling party.

The method finally includes generating a message to an MSC serving the calling party including a message number and a message parameter to be delivered to the calling party (step 118). The message number, for example, may be one that corresponds to a message stating "the local time in the requested area code is" and the message parameter which is inserted therein after the corresponding message would be the determined local time. Thus, if the determined local time is 3:00 a.m., the complete message delivered to the calling party would be "the requested local time is 3:00 a.m."

One part of determining and including a corresponding message ID, of course, includes determining the type of message that is to be delivered to the calling party. If the HLR is able to determine that the calling party mobile station is SMS-capable, then the invention includes delivering an SMS message with the requested information in one embodiment. Accordingly, the corresponding message ID is one for a particular SMS message to be generated by an SMS server including the requested local time. If it is not known that the calling party is utilizing an SMS-capable mobile station, then the message ID is one that corresponds to a message generated by an IVR.

While not explicitly shown here in FIG. 5, it is understood that the method specifically includes, but does not require, receiving a called party phone number. Thus, while the inventive process may be triggered merely with a country code or area code, the invention includes receiving a called party's phone number and determining a local time for the called party based on a last known called party location. Thus, the invention includes receiving call setup signals and, based upon a determined local time for the called party, whether to generate a message to the calling party as a part of routing the call. In one embodiment, again, the message is merely to advise the calling party of a local time for the called party's last known location, while in another embodiment of the invention, the message prompts the calling party to specify whether to leave a message or to complete the call routing. In the first embodiment, it is up to the calling party to hang up prior to call connection. Of course, part of determining the last known location of the called party can include determining whether the called party's mobile station is presently responding to paging signals by the cellular network, and more particularly, by a serving BTS.

Figure 6:
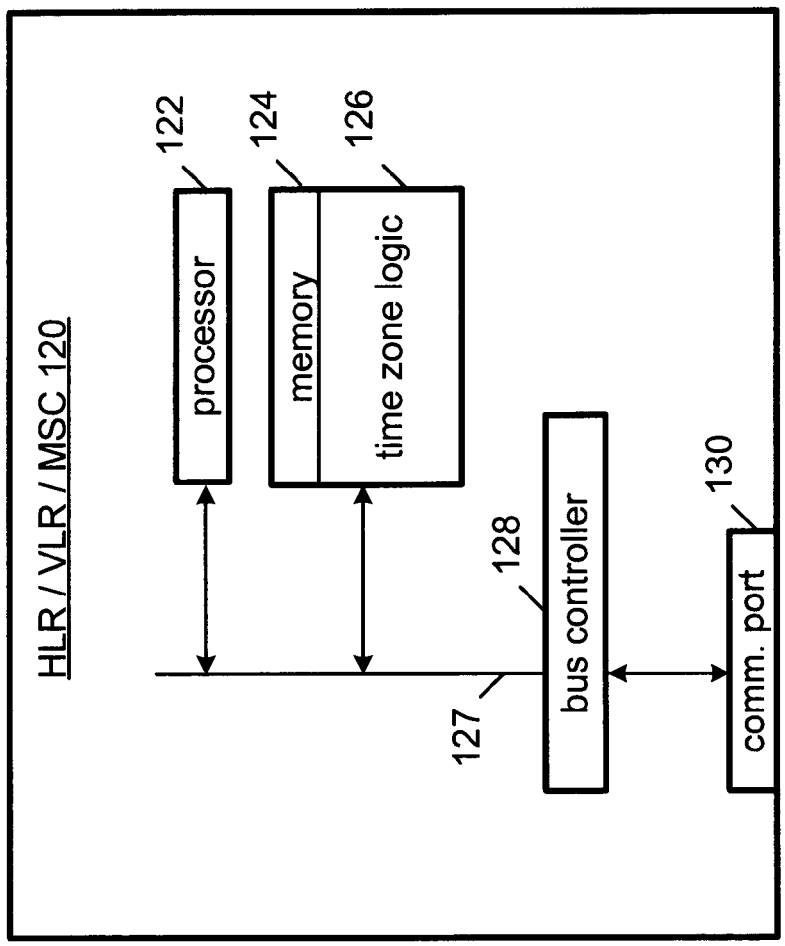
FIG. 6 is a functional block diagram of an HLR/VLR formed according to one embodiment of the invention.

FIG. 6 is a functional block diagram of a communication network element comprising one of an HLR, VLR or MSC formed according to one embodiment of the invention. The reference to HLR/VLR/MSC is a shorthand notation to refer to any of the three devices that may be modified to include logic for the time zone based delivery of services and the "do not disturb" service described herein. Generally, any of the described method steps may be implemented in whole or in part in the logic of the HLR/VLR/MSC. An HLR/VLR/MSC 120HLR/VLR/MSC 120 includes a processor 122 and a memory 124. Memory 124 includes a memory portion 126 that includes computer instructions that define time zone operational logic according to one embodiment of the present invention. Processor 122 is coupled to retrieve the computer instructions stored within memory 124 by way of a bus 127. Communications on bus 127 are controlled by a bus controller 128, as is known by one of average skill in the art. Bus 127 is further coupled to a communication port 130. The HLR/VLR/MSC 120 communicates with external devices over bus 127, through bus controller 128 and out of communication port 130.

The memory portion 126 specifically includes the time zone operational logic described for the various methods of operation described here in this application. Specifically, memory portion 126 includes computer instructions that define logic for performing routine home location register functions (or visitor location register functions), logic for retrieving time zone data from a database device, logic for evaluating the retrieved time zone data, and logic for generating to an MSC a signal containing a message number and a parameter (time zone data). The computer instructions further include logic for receiving call setup signals for a called party mobile station, examining a subscriber profile for the called party mobile station, determining a last known location for the called party mobile station, and determining whether to deliver a message to the calling party to prompt the calling party to leave a message. The computer instructions further include logic for determining a local time for the called party mobile station either based upon a local time or upon an entered time. Finally, the computer instructions define logic for determining whether the calling party is SMS-capable and for determining whether to generate an SMS message or an IVR message to the calling party.

FIG. 7 is a flowchart illustrating an alternate embodiment of the present invention. Initially, a calling party MSC receives call origination signals for a called party mobile station (step 132). The MSC then determines if a "do not disturb" feature is active for the called party (step 134). The step of determining whether a "do not disturb" feature is active for the called party can be performed by an MSC or, alternatively, an HLR. In one embodiment of the described invention, a home MSC for the called party is operable to determine whether a "do not disturb" feature is active for any of the MSCs for which it serves as a home MSC. In an alternate embodiment of the invention, however, a calling party MSC merely produces a location update request signal to an HLR/VLR wherein the HLR/VLR determine whether a "do not disturb" feature is active for the called party and, if so, returns an indication of the same to the calling party MSC. The "do not disturb" is a selectable feature, in this embodiment, and is one that prompts a calling party MSC to play a message to the calling party regardless of the time.

Proceeding forward with the inventive method of FIG. 7, if the "do not disturb" feature is active for the called party, then the calling party MSC generates signals to one of a short message service server or to an interactive voice response unit to prompt a corresponding message to be delivered to the called party indicating that the called party is not to be disturbed except in case of emergency (or as specified). The message generally can be produced by any type of message delivery device. In the described embodiments of the invention, the calling party MSC identifies to the message delivery device what message should be delivered.

Additionally, the "do not disturb" feature may be activated in a plurality of ways. In one embodiment of the described invention, a "soft" button is produced on a called party phone display to enable the called party to turn on the "do not disturb" feature to prevent calls from being routed to the called party except in cases of emergency. In an alternate embodiment, a dedicated switch is provided on the called party phone to enable the called party to selectively activate and deactivate the "do not disturb" feature. Generally, whenever the "do not disturb" feature is activated, telephone calls will not be routed to the called party without initially playing a message to the calling party to advise the calling party that the calls should not be routed or that the called party is not to be disturbed unless an emergency exists.

If the "do not disturb" feature has not been activated for the called party, the invention includes determining whether a subscriber profile for the called party mobile station has a specified "do not disturb" time range (step 138). As has been described in other embodiments of the present invention, the "do not disturb" time range may be networked-defined or may be user-defined. If the called party mobile station has a specified "do not disturb" time range, the invention includes determining a last known location for the called party mobile station and determining a local time for that last known location of the called party (step 140). If the local time for the last known location of the called party mobile station is within a "do not disturb" time range as has been defined by the called party or as defined by the network, the invention includes determining whether the called party local time or other location information may be provided to the calling party (step 142). For example, in one embodiment of the invention, the called party may also select the type of message that is played to a calling party wherein the type of message specifies one of whether the local time is within a "do not disturb" range, whether the local party does not wish to be disturbed at the present time, or merely whether the call cannot be routed as requested except for in cases of emergency. Thus, the invention specifically includes providing a user interface to enable the called party to specify what type of message is played to a calling party either whenever a local time for the last known location of the called party is within a specified "do not disturb" time range. Accordingly, the calling party MSC generates a message number to the specified message delivery device to prompt it to play a corresponding message. Moreover, if a specified parameter is to be delivered as a part of the message (for example, a local time for the called party), the MSC produces that parameter to the message delivery device. For example, if a time value is to be delivered to the calling party as a part of the message, then that time value is produced to the message device. Thereafter, according to the various called party selected options, a corresponding message is produced to the calling party (step 136). It should be understood that FIG. 7 illustrates one embodiment of the present invention, moreover, FIG. 7 illustrates two branches of logic. Some of the steps may be moved from either branch to the other according to implementation preferences by a network or service provider.

The invention disclosed herein is susceptible to various modifications and alternative forms. Specific embodiments therefore have been shown by way of example in the drawings and detailed description. It should be understood that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method in a calling party serving MSC of a telecommunications network for routing a call, comprising:
   receiving at the calling party serving MSC call set-up signals for a called party mobile station;
   producing the called party number to a home location register;
   receiving, from the home location register, a called party serving MSC Id number and a local time for one of the called party serving MSC or the called party;
   sending a message number and associated parameters to an IVR to prompt the IVR to play a specified IVR message to the calling party;
   receiving an indication from the IVR either that the call is to be set up or that a message should be stored;
   setting up the call with the called party serving MSC; and
   connecting the call between the calling party and the called party.

2. The method of claim 1 wherein one of the home location register (HLR) and a visitor location register (VLR) determines a local time value for a last known location of the called party mobile station.

3. The method of claim 2 further including a step of determining whether a "do not disturb" feature is active for the called party mobile station and further includes determining whether the called party mobile station is a subscriber of the "do not disturb" feature and is performed by an MSC.

4. A method in a home location register, comprising:
   receiving at least one of a country code, an area code or a cell phone number from a serving mobile switching center (MSC) for a user equipment terminal in a local time request signal;
   receiving a location update request signal specifying a called party mobile station ID and determining, based upon a determined local time for a last known location of the called party mobile station, whether to route the call or whether to generate a message number corresponding to a message to be originated by a message delivery device for delivery to the calling party mobile station;
   determining a local time responsive to receiving the local time request signal; and
   producing the local time to the MSC serving the user equipment terminal for delivery to the user equipment terminal.

5. The method of claim 4 further including receiving a specified time value and determining a corresponding time value for one of the country code, area code or a last known location for a mobile station corresponding to the cell phone number.

6. The method of claim 5 further including determining whether to deliver an SMS message or an IVR message to the user equipment terminal.

7. The method of claim 6 further including determining that the user equipment terminal is an SMS message-capable mobile station.

8. The method of claim 7 wherein the message merely provides a time corresponding to the country code or area code.

9. The method of claim 4 further including determining whether a local time is to be provided to the calling party and, if so, providing a local time for the last known location of the called party mobile station to the calling party MSC.

10. The method of claim 9 further including evaluating whether the called party has specified whether a local time is to be provided to the calling party.

11. A Home/Visitors' Location Register (HLR/VLR), comprising:
 a processor for executing computer instructions;
 a memory for storing the computer instructions, wherein the computer instructions include logic for:
 performing routine home location register functions;
 retrieving time zone data from a database;
 evaluating the retrieved time zone data;
 receiving call setup signals for a called party mobile station;
 examining a subscriber profile for the called party mobile station;
 determining a last known location for the called party mobile station;
 determining whether to deliver a message to a calling party mobile station to prompt the calling party mobile station to leave a message;
 receiving a calling party mobile station response by way of a mobile switching center; and
 storing a message or for routing the call to the called party mobile station; and
 logic for generating a message to an MSC corresponding to the retrieved time zone data.

12. The HLR/VLR of claim 11 wherein the computer instructions further include logic for determining a local time for the called party mobile station.

13. The HLR/VLR of claim 11 wherein the computer instructions further include logic for, based upon the local time for the called party mobile station and upon the called party mobile station's subscriber profile, that the call is not to be set up without first generating a specified message to the calling party mobile station.

14. The HLR/VLR of claim 11 wherein the computer instructions further include logic for generating a message number and a message parameter to the MSC serving the calling party mobile station to enable the calling party mobile station's MSC to prompt one of a short message service server or an interactive voice response unit to generate a specified message.

15. The HLR/VLR of claim 14 wherein the computer instructions further include logic for determining whether the calling party mobile station is SMS-message capable.

16. A method in a mobile switching center (MSC), comprising:
 receiving call set-up signals for a call being established between a calling party and a called party;
 sending to a home location register one of a location update request signal to determine a serving MSC for the called party and a local time request signal;
 receiving a local time for one of a last known location for the called party, a country code or an area code;
 comparing the local time to a do not disturb time range;
 generating a message number to a message delivery device to prompt the message delivery device to generate a message for the calling party; and
 playing the message to the calling party.

17. The method of claim 16 further including generating a message number to a message delivery device to prompt the message delivery device to generate a message for the calling party.

18. The method of claim 17 further including routing the call after delivering the message.

19. The method of claim 17 wherein the message delivery device is one of a short message service server or an interactive voice response unit.

20. The method of claim 17 further including the step of determining whether a local time for the last known location of the called party is to be transmitted to the calling party.

21. The method of claim 20 wherein the determining step is based upon a subscriber profile indication.

* * * * *